United States Patent
Lee

(10) Patent No.: US 6,747,828 B2
(45) Date of Patent: Jun. 8, 2004

(54) APPARATUS AND METHOD FOR DETECTING AN ABNORMALITY IN A RECORDED SIGNAL

(75) Inventor: Chang-Hyeon Lee, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 367 days.

(21) Appl. No.: 09/789,822

(22) Filed: Feb. 22, 2001

(65) Prior Publication Data

US 2002/0114094 A1 Aug. 22, 2002

(51) Int. Cl.[7] .............................. G11B 5/09; G11B 15/14
(52) U.S. Cl. .......................... 360/53; 360/64; 360/31; 360/84; 360/69; 360/75; 360/71
(58) Field of Search ........................ 360/31, 53, 71, 360/84, 62, 73.03, 27, 38.1, 74.1, 64, 46, 61, 69, 32, 72.1, 75, 60, 55, 122

(56) References Cited

U.S. PATENT DOCUMENTS

| | | | |
|---|---|---|---|
| 3,864,736 A | * 2/1975 | Hazzard | 360/53 |
| 4,849,979 A | 7/1989 | Maccianti et al. | 371/68 |
| 5,018,036 A | * 5/1991 | Yamashita | 360/271.5 |
| 5,291,342 A | * 3/1994 | Kim | 386/72 |
| 5,438,459 A | * 8/1995 | Suga et al. | 386/2 |
| 5,479,098 A | * 12/1995 | Yokoyama et al. | 324/212 |
| 5,535,065 A | * 7/1996 | Tanizawa | 360/31 |
| 5,923,485 A | * 7/1999 | Ito | 360/31 |
| 5,966,279 A | * 10/1999 | Shimura et al. | 360/137 |
| 6,134,384 A | 10/2000 | Okamoto et al. | 386/116 |
| 6,141,164 A | * 10/2000 | Ishibashi et al. | 360/53 |
| 6,141,486 A | 10/2000 | Lane et al. | 386/68 |
| 6,163,421 A | 12/2000 | Shinpuku et al. | 360/46 |
| 2001/0013985 A1 | * 8/2001 | Baba et al. | 360/60 |

FOREIGN PATENT DOCUMENTS

| | | |
|---|---|---|
| JP | 06-76552 | 3/1994 |
| JP | 10-31807 | 2/1998 |

OTHER PUBLICATIONS

"*Communication*" and "*Partial Search Report*" issued by European Patent Office dated on Mar. 18, 2002.

* cited by examiner

Primary Examiner—David Hudspeth
Assistant Examiner—Natalia Figueroa
(74) Attorney, Agent, or Firm—Robert E. Bushnell, Esq.

(57) ABSTRACT

An apparatus for detecting an abnormality of a recorded signal of a recorder/player includes a plurality of recording/reproducing heads for recording/reproducing a signal onto/from a medium, and a determining portion for determining an abnormality of the recorded signal based on the signal reproduced by the recording/reproducing heads. While one recording/reproducing head records the signal of image and/or sound on the medium, the other recording/reproducing head reproduces the signal recorded by the recording/reproducing head. The determining portion determines the abnormality of the recorded signal by determining whether or not the signal reproduced from the medium is in a normal data format, or by determining whether or not an envelope of reproduced signals is greater than a predetermined level. Accordingly, when abnormality of recorded signal occurs due to a presence of foreign substances on the heads or from other problem sources, a user is immediately notified of such an abnormality.

40 Claims, 10 Drawing Sheets

APPARATUS AND METHOD FOR DETECTING AN ABNORMALITY IN A RECORDED SIGNAL

BACKGROUND OF THE INVENTION

1. Technical Field

The present invention relates to an apparatus and process for detecting an abnormality in a recorded signal, and, more particularly, to apparatus and processes for detecting abnormalities in recorded signals during the recording of the signal onto a recording medium.

2. Related Art

Generally, a digital magnetic recorder/player such as a digital video cassette (DVC), or the like, records and reproduces a digital signal, with advantages of higher quality of image and sound over an analog type signal, and also an easier editing process. The digital magnetic recorder/player generally uses a magnetic tape as a recording medium for storing the digital data of image and sound. Heads are formed on a rotary head drum of the recorder/player to record and reproduce signals on and from the magnetic tape.

During the use of the recorder/player, possibility is high that foreign substances are transferred from the magnetic tape to the head. Another high possibility is that foreign substances, floating in air, can be attached to the surface of the head. In the event that foreign substances are attached to the surface of the head, malfunction occurs in recording or reproducing process, causing undesired and abnormal signal recording or reproducing. In order to eliminate the foreign substances, a foreign substance cleaning tape is used, and sometimes, a user eliminates the foreign substances manually.

The source of abnormal recording/reproducing comes not only from the presence of foreign substances on the surface of the head, but also from problems associated with the head itself, or the errors of peripheral circuits which supply recorded signal to the head. Whether the abnormal signal recording is caused by the presence of foreign substances on the head or from problems associated with the head or other devices, the overriding difficulty is that the user does not immediately learn about the presence of the abnormality because the user is not provided with any way to either detect the occurrence of the abnormality or to identify or otherwise locate the cause of the abnormality. Although a user could consider the quality of image and sound for determining abnormal signal recording through the user's anatomical audio and visual senses during reproducing process, during the recording process, the user is not able to determine if the abnormal signal is being recorded or if the information that is being recording is not being recorded at all. As a result, the user usually keeps recording for a long period of time, only to find that all of the user's labors were a waste of time and effort. I have noticed that recording operations that produce errors or abnormalities can be extremely inconvenient; often the recording efforts can not be recreated once the defective equipment has been repaired or replaced. Efforts have been made to improve recording technologies.

Exemplars of recent efforts in the art include U.S. Pat. No. 6,141,486 for METHODS AND APPARATUS FOR RECORDING DIGITAL DATA INCLUDING SYNC BLOCK AND TRACK NUMBER INFORMATION FOR USE DURING TRICK PLAY OPERATION issued to Lane et at., U.S. Pat. No. 4,849,979 for FAULT TOLERANT COMPUTER ARCHITECTURE issued to Maccianti et al, U.S. Pat. No. 6,141,164 for DATA RECORDING/REPRODUCING APPARATUS EMPLOYING READ-AFTER-WRITE SYSTEM issued to Ishibashi et al, U.S. Pat. No. 6,134,384 for DIGITAL SIGNAL RECORDING/REPRODUCING APPARATUS AND RECORDING METHOD issued to Okamoto et al., U.S. Pat. No. 5,291,342 for MULTIFUNCTIONAL CONTROL TYPE VIDEO HEAD SELECTING DEVICE AND METHOD THEREOF issued to Kim, and U.S. Pat. No. 6,163,421 for AZIMUTH MAGNETIC RECORDING AND REPRODUCING APPARATUS AND METHOD EMPLOYING WAVEFORM EQUALIZATION issued to Shinpuku et al. While these recent efforts provide advantages, I note that they fail to adequately provide an apparatus and method for efficiently and conveniently detecting abnormalities in recorded signals.

SUMMARY OF THE INVENTION

It is therefore, one object of the present invention to provide an improved process and apparatus for recording information.

It is another object to provide a process and apparatus that enables a user to promptly detect the presence of abnormalities in information recorded onto a record medium.

It is still another object to provide a process and apparatus that enables a user to promptly detect the occurrence of abnormalities during the recording of information onto a record medium.

It is yet another object to provide an apparatus and process for detecting an abnormality of recorded signal of a digital magnetic recorder/player during a process of recording a signal on a magnetic tape, which is occurred when recording is abnormally performed by the presence of foreign substances on the head or by other problem sources.

These and other objects may be attained with an apparatus for detecting an abnormality of a recorded signal of a digital magnetic recorder/player according to the present invention, including a plurality of heads for recording/reproducing a signal on/from a magnetic tape, a control portion for controlling the heads in such a manner that the signal, recorded by at least one head, is reproduced from the magnetic tape while the signal is recorded on the magnetic tape, and a determining portion for determining abnormality of recorded signal based on the signal reproduced from the magnetic tape.

The determining portion determines the abnormality of recorded signal based on the fact whether or not a data format of at least a part of the signal reproduced from the magnetic tape is normal, and also determines malfunction of the heads based on a result obtained after comparing the signal reproduced from the magnetic tape with a reference signal.

The plurality of heads include a first recording/reproducing head and a second recording/reproducing head disposed on opposite outer surfaces of a head drum, and a third reproducing/reproducing head disposed on the outer surface the head drum and between the first and second recording/reproducing heads. Preferably, the first and second recording/reproducing heads are used to record/reproduce data in a standard definition (SD) mode for recording/reproducing, and the third reproducing/reproducing head is used in a standard definition long-play (SDL) mode of the recording/reproducing and not used in the standard definition (SD) mode.

According to the present invention, while the digital magnetic recorder/player performs recording, abnormality of recorded signal is detected by reproducing a signal from the magnetic tape just after the signal is recorded, and then inspecting the signal or comparing the signal with a reference signal. Also, especially when using the head, which is not used in a standard definition mode, for the purpose of detecting the abnormality of recorded signal, there is an advantage of not having to install an additional recording/reproducing head for detecting abnormality.

Meanwhile, according to the present invention, there is provided a method for detecting an abnormality of recorded signal of a digital magnetic recorder/player, including the steps of recording a signal on a magnetic tape, reproducing the signal from the magnetic tape, and determining abnormality of recorded signal based on the signal reproduced from the magnetic tape.

To achieve these and other objects in accordance with the principles of the present invention, as embodied and broadly described, the present invention provides an apparatus detecting abnormalities, said apparatus comprising: a plurality of heads recording data onto a medium and reproducing data from the medium; a controlling unit controlling said plurality of heads to reproduce a signal from the medium while the signal is being record ed onto the medium; and a determining unit determining an abnormality in the recorded signal in dependence upon the signal reproduced from the medium.

To achieve these and other objects in accordance with the principles of the present invention, as embodied and broadly described, the present invention provides a method for detecting an abnormality of a recorded signal, comprising the steps of: recording a signal on a medium; reproducing the signal from the medium; and determining an abnormality of the recorded signal in dependence upon the signal reproduced from the medium.

To achieve these and other objects in accordance with the principles of the present invention, as embodied and broadly described, the present invention provides an apparatus, comprising: a plurality of heads recording data onto a medium and reproducing data from the medium, said heads reproducing a signal from the medium while the signal is being recorded onto the medium; and a determining unit determining an abnormality in the recorded signal in dependence upon the signal reproduced from the medium.

To achieve these and other objects in accordance with the principles of the present invention, as embodied and broadly described, the present invention provides a recording and reproducing apparatus, comprising: a controller outputting first and second switching signals; a first switch operating in response to said first switching signal, said operating of said first switch activating a first head to record first data onto a medium; and a second switch operating in response to said second switching signal, said operating of said second switch activating a second head to reproduce second data from the medium, said second data corresponding to said first data recorded on the medium; said reproducing of said second data being performed during said recording of said first data.

To achieve these and other objects in accordance with the principles of the present invention, as embodied and broadly described, the present invention provides a recording and reproducing apparatus, comprising: a processor having an input terminal and an output terminal; said processor outputting a first data signal from said output terminal; and said processor receiving a second data signal at said input terminal during said outputting of said first data signal.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate art may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
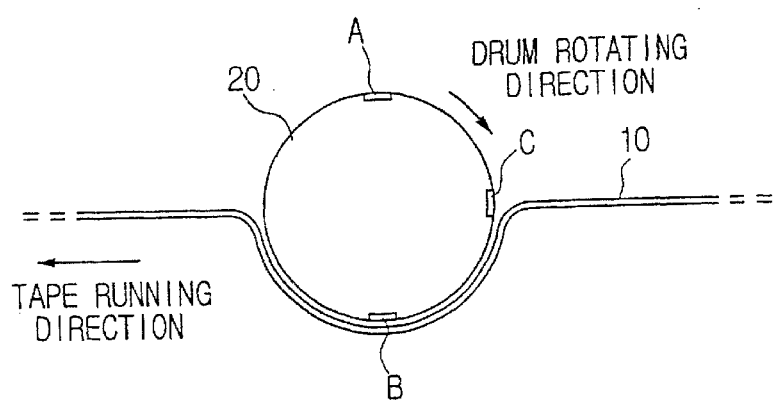
FIG. 1 is a schematic side view showing an arrangement of a head drum and a magnetic tape of a digital magnetic recorder/player.
Figure 2:
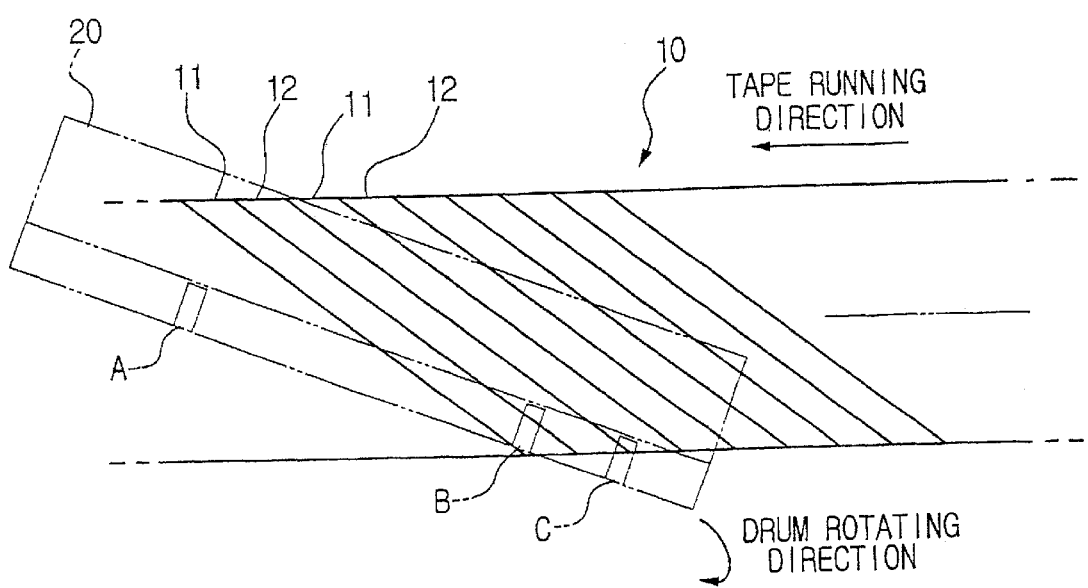
FIG. 2 is an enlarged top view of FIG. 1.

The present invention will be described in greater detail below with reference to the accompanying drawings. First, the structure of a general head drum and a magnetic tape will be described, and the description of the apparatus and method of the present invention will follow. Turning now to the drawings, FIGS. 1 and 2 schematically show the arrangement of the head drum and the magnetic tape in a digital magnetic recorder/player. When a cassette, housing a roll of magnetic tape (not shown), is inserted in the digital magnetic recorder/player such as digital video cassette, or the like, as shown in FIG. 1, the magnetic tape 10 surrounds approximately a half of an outer circumference of the head drum 20. Next, when a motor (not shown) drives the cassette, the magnetic tape 10 in the cassette runs in a longitudinal direction thereof as indicated by the "tape running direction" arrow in FIG. 1. Simultaneously, the head drum 20 is rotated in the direction indicated by the "drum rotating direction" arrow by a drum motor (not shown).

The magnetic tape 10 includes a plurality of slant tracks 11 and 12 which are formed along the longitudinal direction thereof. As shown in FIG. 2, the slant tracks 11 and 12 are at a predetermined angle with respect to the longitudinal direction of the magnetic tape 10.

As shown in FIG. 2, the head drum 20 is disposed at a predetermined angle with respect to the longitudinal direction of the slant tracks 11 and 12. On the outer surface of the head drum 20, three heads, i.e., first, second, and third heads A, B, and C are installed. Generally, the first head is called a head A, the second head is called a head B, and the third head is called a head C, respectively. Heads A and B are disposed on the outer surface of the head drum 20, opposite to each other, that is, spaced from each other at an angle of 180 degrees (180°). The head C is disposed between the heads A and B in a manner of being spaced from the heads A and B at an angle of 90°.

Heads A and B correspond to the second and first slant tracks 12 and 11, respectively. In other words, head B records and reproduces signal on and from the first slant tracks 11, while the head A records and reproduces the signal on and from the second slant tracks 12.

During the rotation of the head drum 20 by 180°, the magnetic tape 10 runs a distance corresponding to the width of one track. When the head drum 20 is rotated, the magnetic tape 10 is moved, and the head B, which is positioned at a lower end of the first slant track 11, moves along the first slant track 11. When the head B reaches an upper end of the first slant track 11, the head A is positioned at the lower end of the second slant track 12 next to the first slant track 11. By repeating the above processes, the heads B and A sequentially record a signal onto, or reproduce a signal from, the first and second slant tracks 11 and 12 which are formed in an alternate fashion.

In accordance with the principles of the present invention, there are mainly two modes of recording a signal onto tape 10. The same two modes also apply to the process of reproducing a signal from tape 10. The two modes are: a standard definition (SD) mode, used in the above is description, and a standard definition long-play (SDL) mode. Included within the standard definition mode, there are two sub-types: standard play (SP) and long play (LP).

The standard definition (SD) mode is used in a standard mode of the data recording or 18 reproducing modes, in which heads A and B perform a normal recording or reproducing operation.

The standard definition long-play (SDL) mode is used in a long-play mode of the data recording/reproducing modes, in which heads A and C perform the recording and reproducing operation. The signal recording and reproducing operation of the heads A and C of the SDL type is similar to the recording and reproducing operation of the heads A and B of the SD type. Accordingly, with the digital magnetic recorder and player having heads A, B, and C, as described above, the user can select SD and SDL types as she/he wishes when recording and reproducing signals.

It is possible to let head C remain unused during a recording operation in the standard definition (SD) mode, and just use heads A and B in the standard definition mode. However, I have discovered that a head C can be used advantageously during a recording operation in the standard definition (SD) mode, in accordance with the principles of the present invention. In the present invention, which is the subject of this patent application, the head C is used in the standard definition (SD) mode in order to notify a user of a faulty recording which is being performed, in accordance with the principles of the present invention. In other words, the present invention uses heads A, B, and C during a recording process when the standard definition (SD) mode of recording is performed. In an apparatus that can record in SD and SDL mode, there can be three heads, whereas heads A and B are used to record in SD mode, and heads A and C are used to record in SDL mode. Thus, in that apparatus, the head C would be unused during a recording in SD mode. The present invention efficiently and advantageously utilizes the unused head C when recording in SD mode. The present invention uses head C to read data when a recording in SD mode is being performed.

Figure 3:
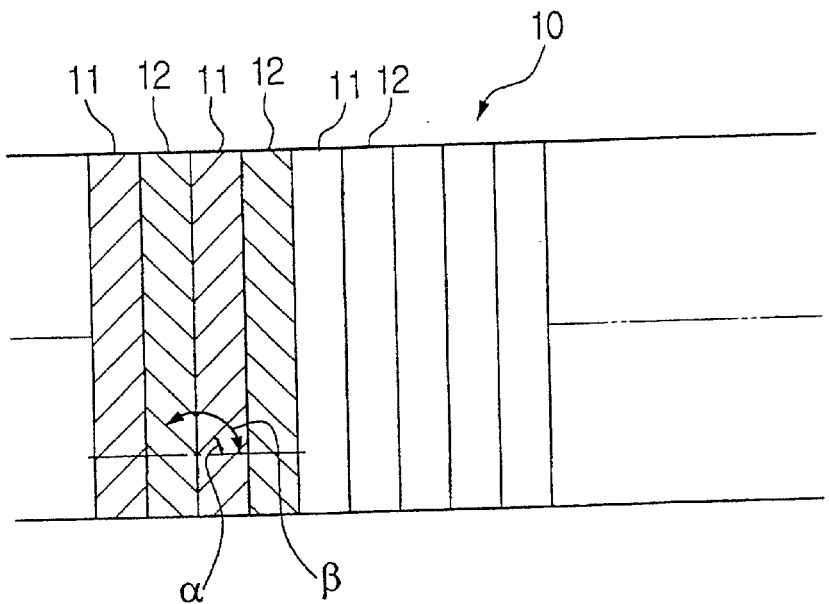
FIGS. 3 and 4 are partial plan views showing the structure of the magnetic tape.
Figure 4:
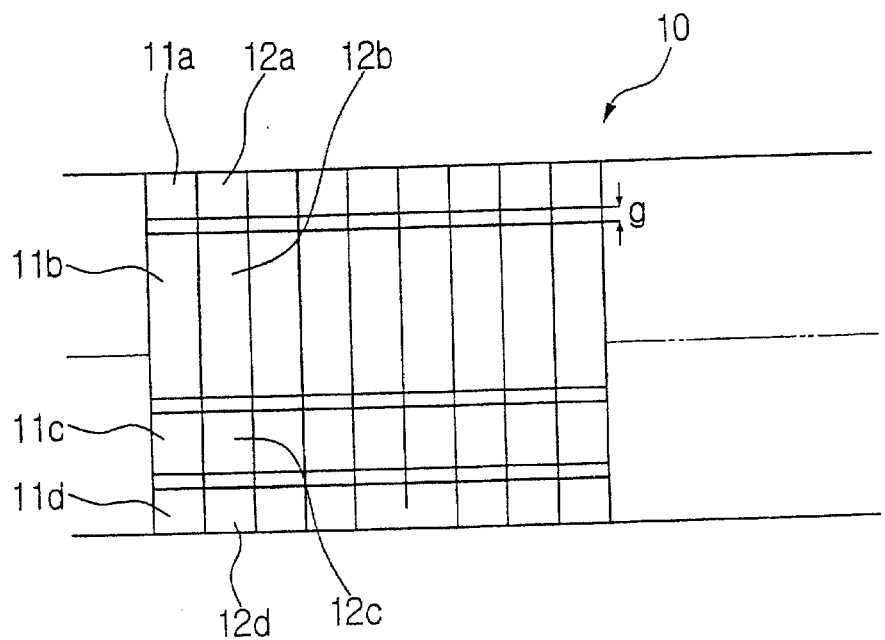

FIGS. 3 and 4 show the structure of the magnetic tape 10. While the respective slant tracks 11 and 12 are actually slant at a predetermined angle with respect to the longitudinal direction of the magnetic tape 10, for an easier reference of readers, FIGS. 3 and 4 show the slant tracks 11 and 12 formed in a perpendicular relation with respect to a running direction of the magnetic tape 10.

The slant tracks 11 and 12 consist of first slant tracks 11 and second slant tracks 12, which are formed in alternate fashion with each other. The first and second slant tracks 11 and 12 have different azimuth angles, i.e., the first slant track 11 has the azimuth angle of $\alpha$, while the second slant track 12 has the azimuth angle of $\beta$. The azimuth angles $\alpha$ and $\beta$ of the first and second slant tracks 11 and 12 are opposite to each other, and accordingly, the recording directions of the first and second slant tracks 11 and 12 are different from each other. As described above, the head B corresponds to the first slant tracks 11, while the head A corresponds to the second slant tracks 12. The head A records data with an azimuth angle of a, while the head B records data with the azimuth angle of b. Therefore, the head A only reproduces the signal from the second slant tracks 12, while the head B only reproduces the signal from the first slant tracks 11.

Meanwhile, the heads C and B have the same azimuth angle. Accordingly, the heads B and C can reproduce signals from the same tracks, while they can not reproduce the signals recorded by the head A.

Each of the first and second slant tracks 11 and 12 includes sub-code sectors 11a and 12a, video sectors 11b and 12b, audio sectors 11c and 12c, and insert and track information (ITI) sectors 11d and 12d. The respective sectors 11a, 11b, 11c, 11d, 12a, 12b, 12c, and 12d are spaced from each other by a predetermined gap (g) in order to prevent interferences between the signals recorded thereon. The ITI sectors 1d and 12d store data such as Track Information, and the sub-code sectors 11a and 12a store data like date/time information, index information, track number, or the like. The video sectors 11b and 12b store data about image and its auxiliary data, while the audio sectors 11c and 12c store data about the sound and its auxiliary data. The size and order of data stored in the respective sectors 11a, 11*b*, 11*c*, 11*d*, 12*a*, 12*b*, 12*c*, and 12*d* are arranged in accordance with a predetermined format.

Figure 5:
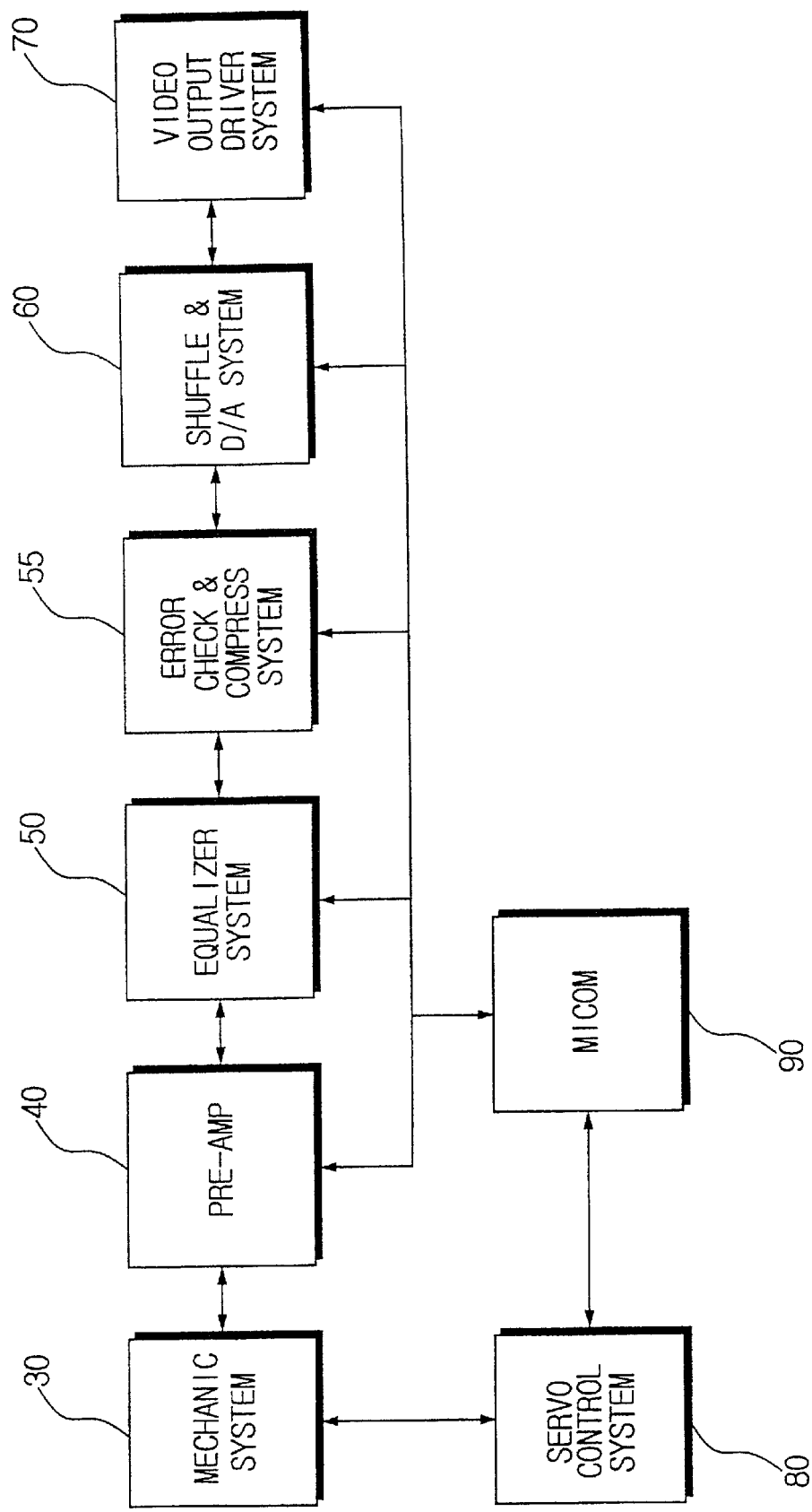
FIG. 5 is a block diagram of the digital magnetic recorder/player having an apparatus for detecting abnormality of recorded signal, in accordance with the principles of the present invention.
Figure 6:
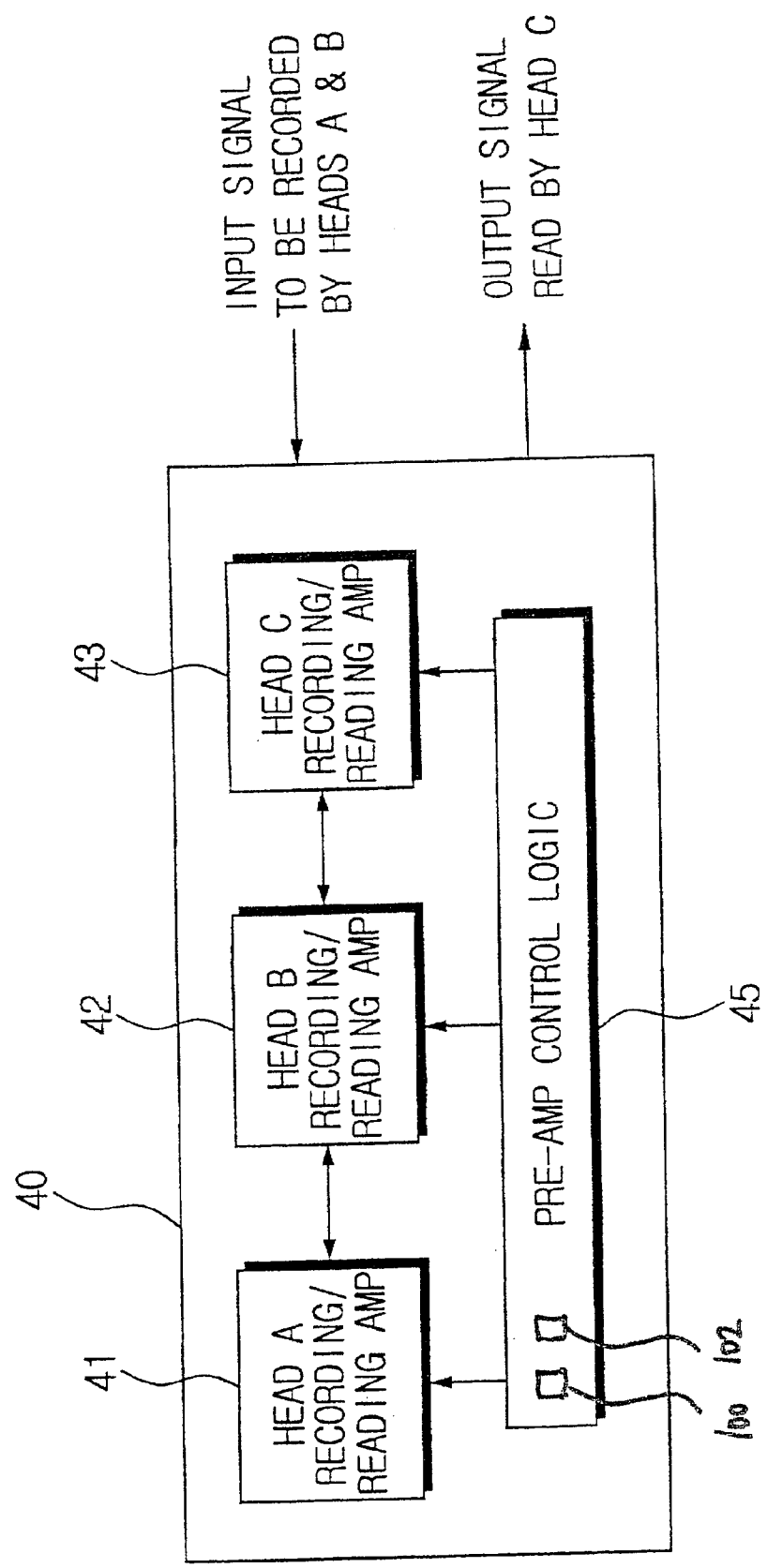
FIG. 6 is a detailed block diagram of a pre-amp shown in FIG. 5, constructed in accordance with the principles of the present invention.

FIG. 5 is a block diagram of a digital magnetic recorder/player having an apparatus for detecting abnormality of recorded signal according to the present invention, and FIG. 6 is a detailed block diagram showing the pre-amp shown in FIG. 5. The digital magnetic recorder/player according to the present invention includes a mechanic system 30 having a plurality of mechanical devices such as a motor for driving a cassette of magnetic tape 10 and a drum motor for driving the head drum 20, a servo control system 80 for the position control and speed control of the mechanic system 30, a pre-amp 40 for amplifying the signal to be recorded onto the magnetic tape 10 or for amplifying the signal that has been reproduced from the magnetic tape 10, an equalizer system 50 for equalizing the signal to be recorded onto the magnetic tape 10 or for equalizing the signal that has been reproduced from the magnetic tape 10, an error checking and compressing system 55 for performing error check and data compression during the signal recording/reproducing operation, a shuffling and digital to analog (D/A) system 60 for shuffling the data of the signal to be recorded onto the magnetic tape 10 or for shuffling the data of the signal that has been reproduced from the magnetic tape 10 and converting digital data to analog data, a video output driver system 70 for producing sound signals through proper devices such as an amplifier, or the like during playing operation, and a microcomputer (micom) 90 for controlling overall recording/playing operation of the digital magnetic recorder/player.

As shown in FIG. 6, the pre-amp 40 includes three recording/reproducing amplifiers 41, 42, and 43 for amplifying the signal to be recorded onto the magnetic tape 10 or for amplifying the signal that has been reproduced from the magnetic tape 10 during recording/reproducing of the heads A, B, and C, and a pre-amp control logic 45 for controlling the recording/reproducing amplifiers 41, 42, and 43. During a detection of an abnormality of recorded signal according to the present invention, the pre-amp 40 amplifies the signal to be recorded on the magnetic tape 10 and transmits the amplified signal to the heads A and B. The pre-amp 40 also amplifies the signal reproduced by the head C and transmits the amplified signal to the microcomputer 90. The pre-amp control logic 45 controls the respective recording/reproducing amplifiers 41, 42, and 43 so that the head C can perform reproducing while the heads A and B perform recording.

Figure 7:
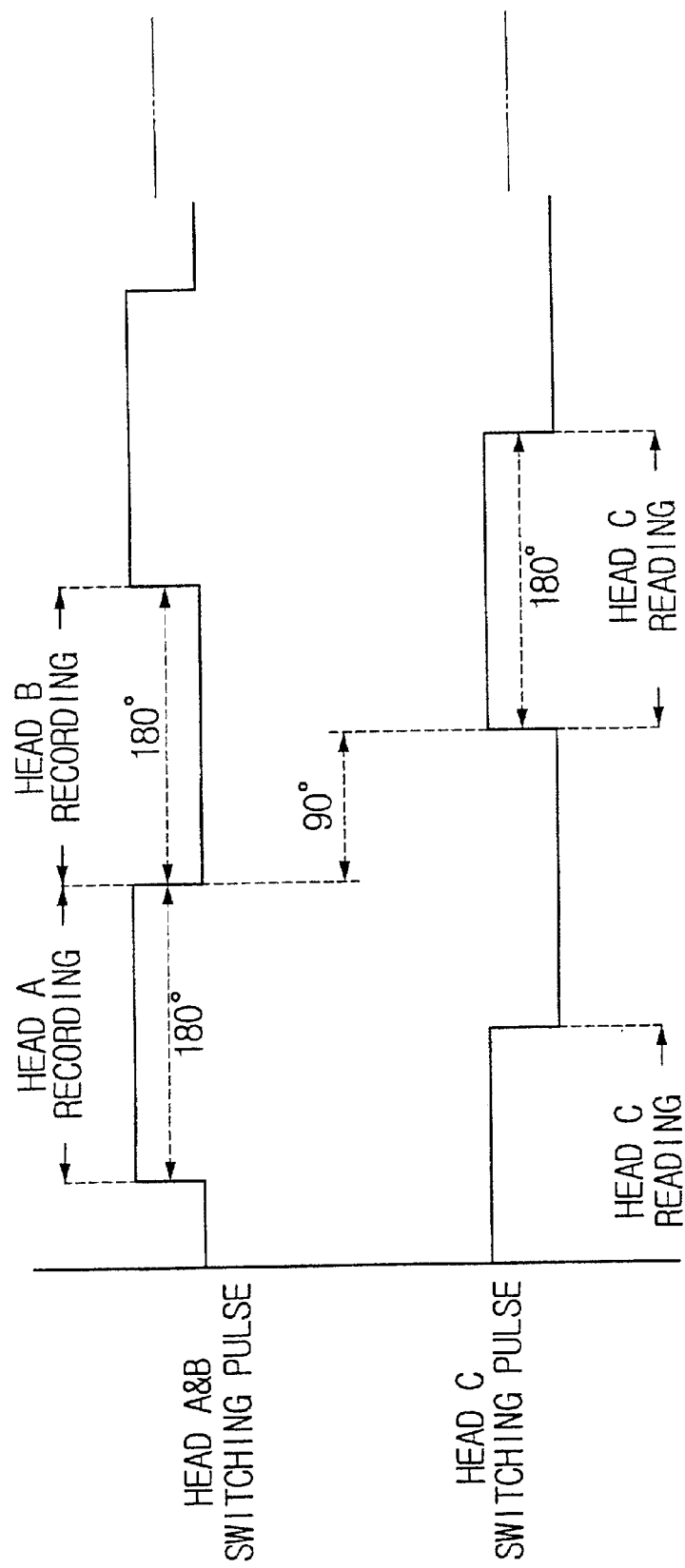
FIG. 7 is a graph showing the switching timing of respective heads for detecting an abnormality of recorded signal, in accordance with the principles of the present invention.

In FIG. 6, pre-amp control logic 45 includes a first switch 100 and a second switch 102, the microcomputer 90 outputs switching pulses to pre-amp control logic 45. The switching pulses are shown in FIG. 7. The switching pulses can also be referred to as switching signals. When the first switch 100 is closed in response to the switching pulse, then the head A will record the input signal. When the first switch 100 is open in response to the switching pulse, then the head B will record the input signal. When the second switch 102 is closed in response to the switching pulse, then the head C will reproduce the recorded signal. The operation of the switches can be modified so that switch 100 is open in response to the switching pulse to cause head A to record the input signal, for example. Different terms can be used to describe the operating of the switches, of course. The switches can be opened/closed, activated/deactivated, turned on/turned off, for example.

FIG. 7 is a graph showing the switching timing of the respective heads A, B, and C which are controlled by the pre-amp control logic 45. As shown in FIG. 7, in a region where the switching pulse for the heads A and B is high, the head A performs recording operation, while in a region where the switching pulse is low, the head B performs recording operation. In a region where the switching pulse for the head C is high, the head C performs reproducing operation, while in a region where the switching pulse is low, the head C stops reproducing operation.

As shown in FIG. 7, the switching pulse for the heads A and B is switched to high or low in every 180° rotation of the head drum 20. Accordingly, during the rotation of the head drum 20, the heads A and B are activated alternately, and sequentially record signal on the second and first slant tracks 12 and 11 of the magnetic tape 10. The switching pulse for the head C is switched to high after a predetermined time from the beginning of the low pulse region of the switching pulse for the heads A and B. Here, the predetermined time corresponds to the 90° rotation of the head drum 20. The switching pulse for the head C is switched to high and low in every 180° rotation of the head drum 20.

FIGS. 8 to 11 show the variation of the position of the heads A, B, and C on the magnetic tape 10 when the heads A, B, and C are controlled as described above with reference to FIG. 7. The FIGS. 8 to 11 are similar to FIGS. 3 and 4, because FIGS. 8 to 11 also show the first and second slant tracks 11 and 12 in a perpendicular relation with respect to the running direction It of the magnetic tape 10 for an easier reference of the readers. The FIGS. 8 to 11 identify the first slant track 11 with reference numeral 11(1), and identify the second slant track 12 with reference numeral 12(2).

Figure 12:
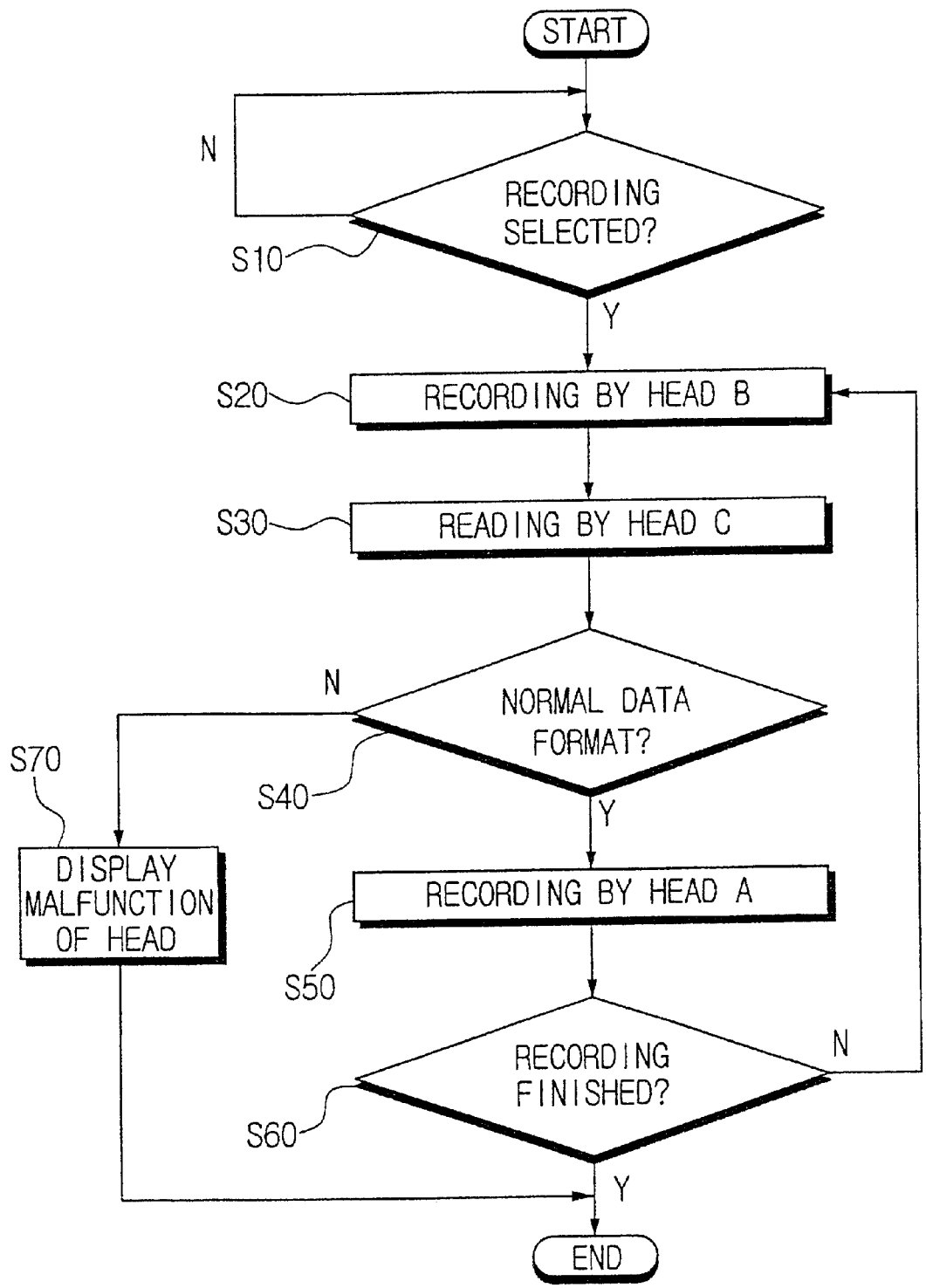
FIG. 12 is a flow chart for explaining a method for detecting abnormality of recorded signal according to a first preferred embodiment of the present invention.

FIG. 12 is a flow chart for explaining a method for detecting abnormality of recorded signal according to the first preferred embodiment of the present invention. At step S10, the inventive recording process is started by the digital magnetic recorder/player when the recording process is selected. The inventive recording process is the process for detecting the abnormality of recorded signal during recording.

Figure 8:
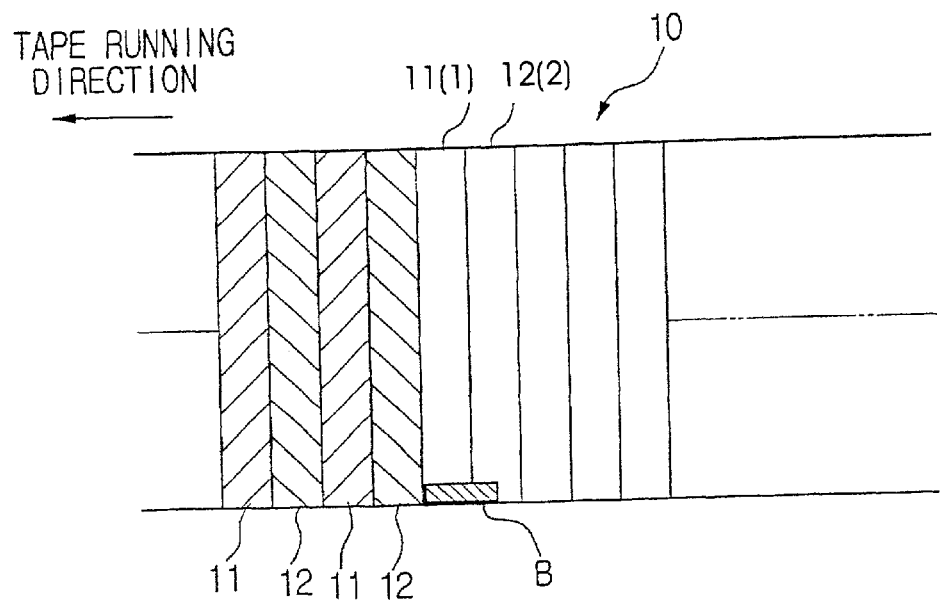
FIGS. 8 to 11 are different views that sequentially show the variation of the position of the heads on the magnetic tape during an abnormality detection of recorded signal, in accordance with the principles of the present invention.

At step S10, the head drum 20 is rotated, and the head B is positioned at the end of the first slant track 11(1). This configuration is shown in FIG. 8. At step S20, the switching pulse of the heads A and B is switched to low, and the pre-amp control logic 45 drives the head B recording/reproducing amplifier 42, activating the recording operation of the head B. The switching pulse is shown in FIG. 7. The switching pulse can also be referred to as a switching signal. The pre-amp control logic 45 and the amplifier 42 are shown in FIG. 6.

The input signal to be recorded is input to pre-amp 40, the input signal is amplified by the pre-amp 42, and recorded on the first slant track 11(1) by the head B. The recording operation is maintained until the head B reaches the upper end of the first slant track 11(1).

The input signal to be recorded by heads A and B is shown to be inputted to pre-amp 40 in FIG. 6. The input signal includes the information that is to be recorded onto the tape 10. That input signal can contain one or more of the following: video information, audio information, text data, formatting data, control data, numeric data, reference data, encryption data, auxiliary data, encoded data, other data.

Figure 9:
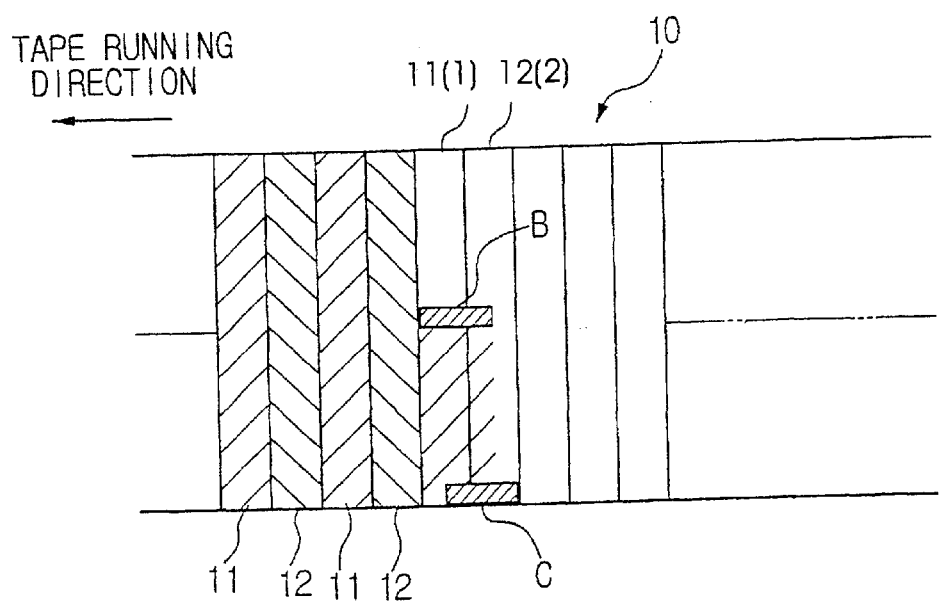

At step S30, when the head B reaches the middle portion of the first slant track 11(1) during the recording operation of the head B, the head C reaches the lower end of the first track 11(1). This configuration is shown in FIG. 9. Also, at step S30, the pre-amp control logic 45 starts reproducing operation of the head C by driving the head C recording/reproducing amplifier 43. Since the width of the respective heads A, B, and C is wider than the width of the respective first and second tracks 11(1) and 12(2), the signal is recorded on the first slant track 11(1) and partially on the second slant track 12(2) next to the first slant track 11(1). The head C reproduces the signal recorded on the first slant track 11(1) and the second slant track 12(2).

Figure 10:
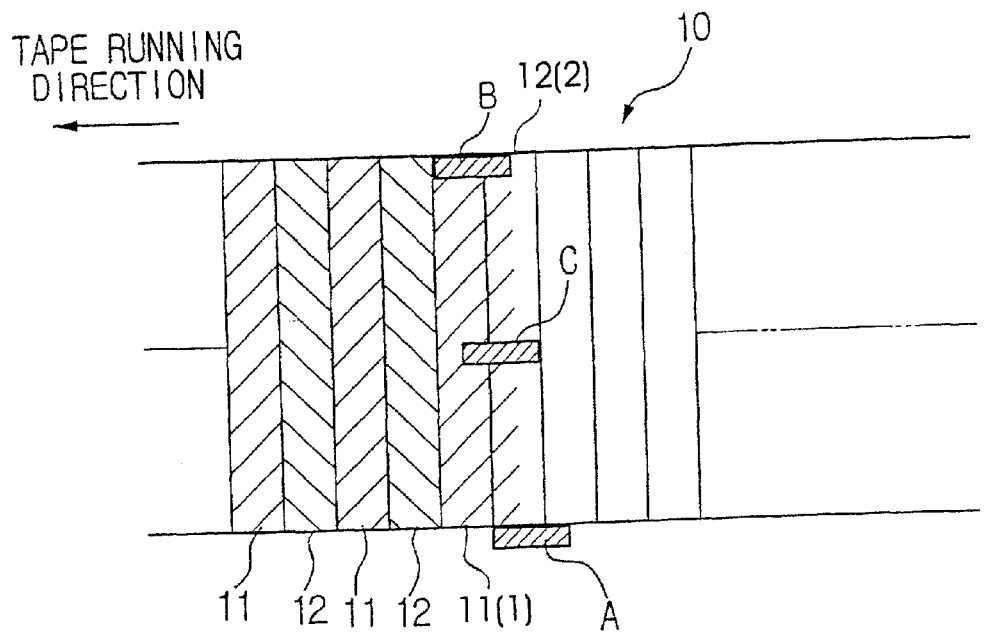

As the head drum 20 keeps rotating, the head C reaches the middle portion of the first slant track 11(1) and the head A reaches the lower end of the second track 12(2). This configuration is shown in FIG. 10. In this situation, the pre-amp control logic 45 stops the recording of the head B, while recording signal on the second slant track 12(2) by driving the head A recording/reproducing amplifier 41. In other words, the pre-amp control logic 45 stops the recording operation performed by head B and starts a recording operation by head A.

Figure 11:
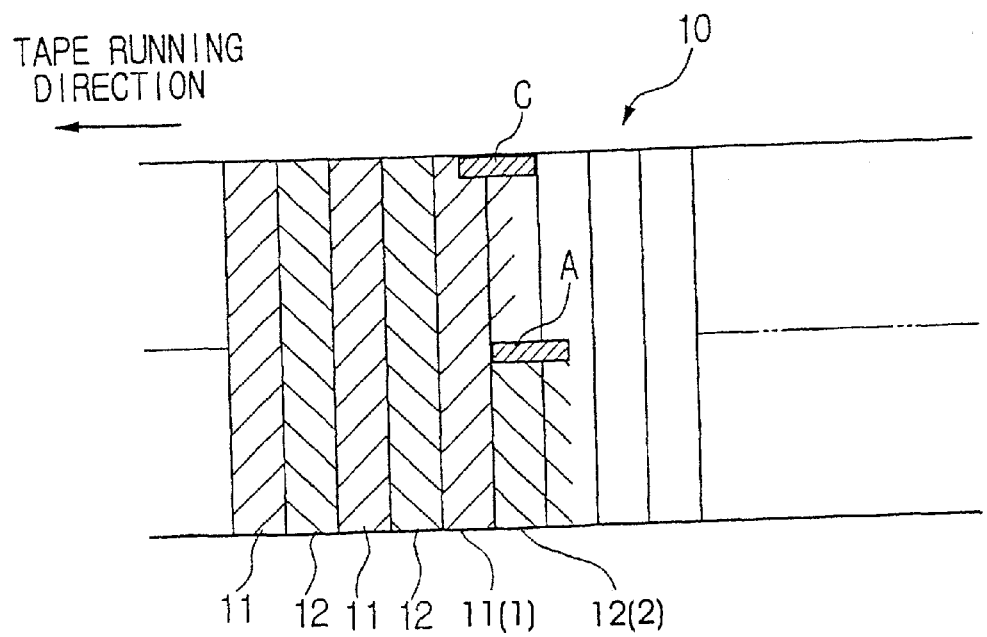

As the head drum 20 keeps rotating, the head C reaches the upper end of the first slant track 11(1), and the head A is positioned on the middle portion of the second slant track 12(2). This configuration is shown in FIG. 11. In this situation, the pre-amp control logic 45 stops the reproducing operation of the head C. Next, the recording operation of the head A is maintained until the head A reaches the upper end of the second slant track 12(2).

When the head A reaches the upper end of the second slant track 12(2), the head B reaches the lower end of the first slant track 11 next to the second slant track 12(2), and the head B re-starts recording operation. By repeating the above processes, the recording operation is continuously performed by the heads A and B, while the head C reproduces the signal recorded by the head B after a predetermined time period.

In this embodiment, there is a slight time delay between the time that head B records data onto the tape 10 and the time that head C reproduces that recorded data. This is true because head C is separately located from head B on the drum 20. Thus, a particular track of tape 10 will be adjacent to head B before that particular track of tape 10 is adjacent to head C. This is consistent with the switching pulses shown in FIG. 7, which show a 90° difference between the beginning of the recording performed by head B and the beginning of the reading by head C. In this embodiment, there is a 90° angle formed at drum 20 between the locations of head B and head C. It is possible to locate heads B and C on drum 20 in other configurations. For example, it is not necessary that a 90° angle formed at drum 20 between the locations of head B and head C. An angle greater than 90° or an angle less than 90° could be used.

Meanwhile, the signal reproduced by the head C is inputted to the microcomputer 90 through the pre-amp 43. At step S40, based on the signal reproduced by the head C, the microcomputer 90 determines whether the recording is being normally performed or not. Determining abnormality of recorded signal of the recorder/player by using signal reproduced by the head C can be performed in many ways. For illustrative purposes, described below are some methods of determining abnormality of recorded signals, in accordance with the principles of the present invention. The microcomputer 90 can use a comparator function to compare the signals in order to detect abnormalities.

One demonstrative example of the actions that occur within step S40 is as follows. The step S40 can correspond to a comparison of data. That is, in step S40, a reference signal can be compared to the signal reproduced by head C. If the reference signal and the signal from head C are substantially equal, then it is deemed that no abnormalities are present, and thus the user is not notified that errors have occurred. However, if the reference signal and the signal from head C are not substantially equal, then it is deemed that abnormalities are present, and thus the user is notified that errors have occurred.

As described above, based on the data of the signal reproduced from the magnetic tape 10 by the head C, the microcomputer 90 determines whether the format of the whole or a part of the data corresponds to the normal format, and accordingly determines whether there is an abnormality in the signal recorded by the head B. In step S40, when the microcomputer 90 determines the recording is normally performed by the head B, then step S50 is performed next. At step S50, the head A performs recording. Then, at step S60, a determination is made as to whether recording is finished. Until the recording is finished, the recording, the reproducing, and the recorded signal abnormality detections are continuously performed (steps S20 to S40).

In step S40, if the microcomputer 90 determines abnormality of the signal recorded by the head B, then the step S70 is performed next. At step S70, the microcomputer 90 indicates abnormal status on a display (not shown) of the digital magnetic recorder/player. Accordingly, the user is notified of the abnormality of the signal, and accordingly deals with the problem such as stopping the recording, having the apparatus repaired, eliminating the foreign substances from the head, or the like. The user can be notified of the abnormality by a sound such as an audio alarm, by a light, by information displayed on a display including text and/or images, or the user can be notified by any combination of sound, light, and information.

The microcomputer 90 can detect an abnormality in a recorded signal of the recorder/player using many different methods. One method that microcomputer 90 can use, for example, to determine that a recorded signal is abnormal, is to compare the data format of the data reproduced from the tape 10 with a predetermined data format. As described above, data can be stored in the respective sectors 11a to 11d of the first slant track 11(1), in accordance with a predetermined data format, and the microcomputer 90 can be provided with information about the predetermined data format. The microcomputer 90 can receive the data format which is reproduced using head C, and then compare that received data format with the predetermined data format.

The predetermined data format information can be any one of many different types of information. The predetermined data format information can be one or more types of information. For example, the predetermined data format can correspond to a synchronization information, identification (ID) information, date-related information, time-related information, index-related information, structure-related information, or another type of information. The predetermined data format can correspond to any predetermined information.

Figure 14:
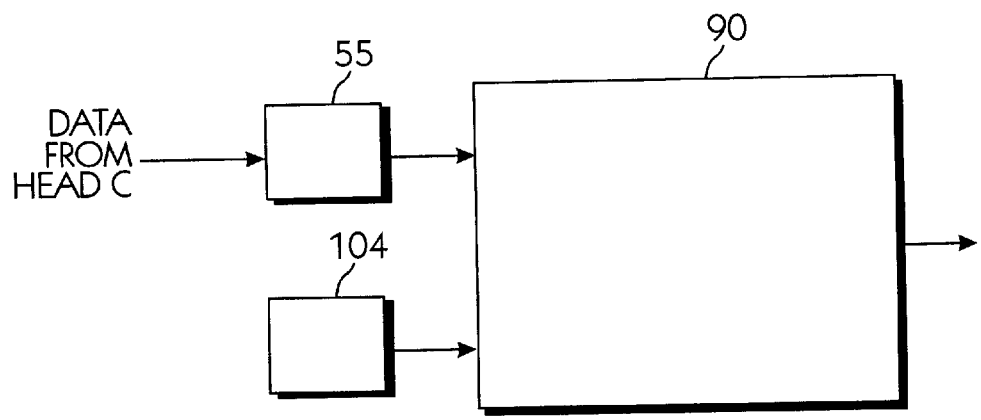
FIG. 14 is a diagram for explaining the comparison performed by a microcomputer to determine if abnormalities exist in a recorded signal, in accordance with the principles of the present invention.

Please turn now to FIG. 14, which is a diagram for explaining the comparison performed by a microcomputer to determine if ab normalities exist in a recorded signal, in accordance with the principles of the present invention. Head C reproduces a recorded signal from tape 10. The reproduced signal is then conveyed from head C to error check and compress system 55 for processing and then to microcomputer 90. The processing performed by error check and compress system 55 is shown in more detail in FIG. 15. The data reproduced by head C can be conveyed to other units, in addition to units 55 and 90, but FIG. 14 has simplified the process for illustrative purposes.

In FIG. 14, the signal reproduced by head C is conveyed to unit 55 for processing and then to microcomputer 90. The microcomputer 90 also receives predetermined data format information stored in memory 104. The memory 104 can be an internal memory of microcomputer 90 or can be an external memory. The memory 104 either is contained within microcomputer 90 or is connected to microcomputer 90. The microcomputer compares the data from unit 55 with the data stored in the memory 104. If a number of differences exceeding a preset threshold are detected, then the microcomputer 90 determines that abnormalities exist and outputs a signal indicating that abnormalities exist to notify a user. If a particular type of differences is detected, then the microcomputer 90 determines that abnormalities exist and outputs an appropriate signal to notify a user.

One example of the process shown in FIG. 14 is as follows. Let us say that a family is making a home movie for their relatives. The home movie is being made on Jan. 10, 2001. If the predetermined data format includes date information, then the memory 104 of the inventive apparatus stores the current date which is Jan. 10, 2001. The family begins to videotape a picnic, and head B records the data onto tape 10. The head B records the current date and time onto the tape 10 by head B, in addition to the video images of the family having a picnic. Very soon after tape B records the data on tape 10, the head C reproduces that recorded information and conveys that information to microcomputer 90. The microcomputer 90 compares the predetermined data received from the memory 104 with the reproduced information received from unit 55. The memory 104 has stored the current date Jan. 10, 2001. If there are no abnormalities, the date in the reproduced information will be the same as the date stored in the memory 104. Thus, the user will not be notified that there are abnormalities. However, if the reproduced information contains a date that is not Jan. 10, 2001, or does not contain any date, or contains corrupted or invalid information, then an abnormality is detected, and so the user will be promptly notified that the abnormality is present. The notification to the user could be in the formn of one or more of the following: a beep or other sound, a flashing or constant light, an image or a text message being displayed, a vibration of the apparatus, or by some other means whereby the user is alerted to the fact that an abnormality exists. The abnormality may exist for many different reasons. The abnormality may be caused by dirt on the head B, for example. Or the abnormality could be the result of a poorly manufactured tape 10, or an excessively used tape 10, or a tape 10 that has been exposed to very high temperatures, or by dirt on the tape 10. Presuming a user is attempting to record onto a tape that is damaged because the tape has been previously exposed to very high temperatures, this is what might happen: first, the user puts the damaged tape into the apparatus and begins to tape the family picnic. The user is immediately notified that an abnormality exists, because the data in memory 104 does not match the data in the reproduced signal. The user is now aware that a problem exists. The user throws away the damaged tape and puts a brand new tape in the apparatus, and begins recording the picnic again. Now the data in memory 104 matches the data in the reproduced signal, and there are no abnormalities.

In this manner, the apparatus of the present invention promptly notified the user that abnormalities existed in the recording of the picnic. If the user was unfortunate enough to be using an apparatus that did not have the advantages of the present invention, the user might have spent the entire afternoon having a picnic with the family and taping the picnic. Then, later that day or later that week, the user would attempt to view the tape. Only then would the user realize that there were errors. The user might be frustrated and dissatisfied. The user had spent time and effort taping the picnic and had basically wasted a lot of time and effort. The user had expected to be able to send the tape to the relatives. But the abnormalities were so severe that the recording of the picnic was unintelligible. The relatives would be disappointed, because they were expecting to see the tape.

The present invention allows the user to immediately be made aware of abnormalities in the recording. Thus, the user can try to use a different tape, or the user can use a different apparatus, or the user can use a cleaning device to clean the heads. The advantage of the present invention is that the user is promptly alerted to the fact that a problem exists. The user does not need to waste a lot of time and effort recording information, only to learn later that all that time and effort was utterly wasted.

Also, the present invention is efficient and sophisticated. No additional heads need to be added to the device. Heads A, B, and C are already there. The present invention uses head C to detect errors in the standard definition (SD) mode. As was stated previously, heads A and B are used in SD mode, whereas head C is not needed, in a related art. Thus, by utilizing a previously unused head C in the detection of abnormalities, the inventor has efficiently and elegantly added important and useful functions to a recording apparatus. No additional heads need to be added to utilize the apparatus and method of the present invention.

Also, the present invention is advantageous because the present invention does not stop recording in order to read the recorded signal. Thus, the head B is able to constantly record the input signal, and the head C is able to constantly reproduce the recorded signal. This is an efficient design. A less efficient design might need to stop recording the signal in order to reproduce the recorded signal. The present invention is advantageous over the aforementioned less efficient design. The useful life of an apparatus can be shortened by excessive starting and stopping. Additional control signals are needed for excessive starting and stopping. Battery life can be reduced due to excessive starting and stopping. Power consumption can increase in an undesirable way due to excessive starting and stopping.

In addition, the head C of the present invention will read data from the same track that was most recently written to. In other words, head B records data to track 11(1) of tape 10 and then head C promptly reproduces that data from track 11(1). This allows the user to be promptly notified of abnormalities, and is also advantageous for reasons of efficiency and design. These features are illustrated in FIGS. 8 to 11, which show head B writing to track 11 (1) and then head C reproducing data that was recorded on track 11(1).

The predetermined data stored in memory 104 can be any one (or more) of many different types of information, as described above. The date is one example. Synchronizing data is another example. Other header-type information is another example. Standard reference data is another example. A combination of different types of information can be used for the predetermined data stored in memory 104.

For example, for normal recording operation, the number of bits of the data reproduced from the magnetic tape 10 will correspond to the number of bits of the data stored in the respective sectors 11*a* to 11*d*. In addition to the above-mentioned way of determining abnormality of recorded signal of the recorder/player, the recorded signal abnormality detection can also be accomplished by using the fact that the sub-code sector 11*a* stores information about date and time. That is, the abnormality of recorded data can be detected either by determining whether the signal reproduced from the magnetic tape 10 contains information about the date and time, or by determining whether the insert and track information (ITI) sector 11d stores information about the tracks.

Figure 13:
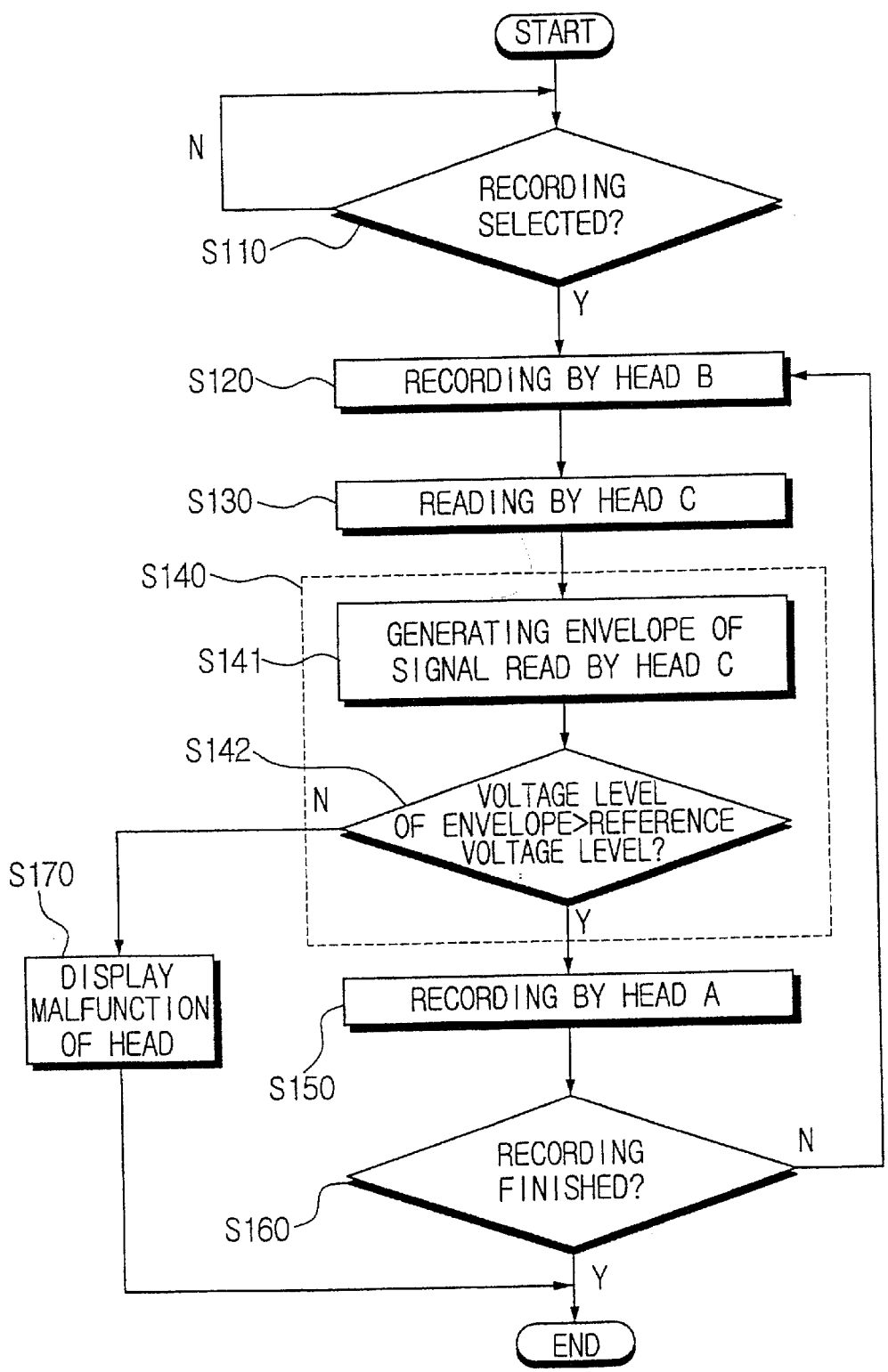
FIG. 13 is a flow chart that explains a method for detecting abnormality of recorded signal according to a second preferred embodiment of the present invention.

FIG. 13 is a flow chart for explaining a method for detecting abnormality of recorded signal according to second preferred embodiment of the present invention. In this embodiment, the steps of selecting recording operation (S110), recording by the head B (S120), reading by the head C (S130), recording by the head A (S150), determining if recording is finished (S160), and displaying malfunction (S170) are similar to the corresponding steps described above in the description of the first embodiment, with reference to steps 10, 20, 30, 50, 60, and 70 of FIG. 12, respectively.

The method of detecting an abnormality in a recorded signal as illustrated in FIG. 13 is different from the method of detecting an abnormality in a recorded signal as illustrated in FIG. 12. The step S40 in FIG. 12 is not the same as the step S140 in FIG. 13. Accordingly, the step S140 of detecting abnormality of recorded signal, which is the unique feature of the second embodiment, will now be described below in greater detail.

The step S140 of FIG. 13 includes the substeps S141 and S142. At step S141, an envelope is generated of the signal reproduced by head C. At step S142, the voltage level of the envelope is compared with a reference voltage level. If the voltage level of the envelope is greater than or equal to the reference voltage level, then the microcomputer 90 determines that no abnormalities exist and then head A records data at step S150. Otherwise, step S170 is performed to alert a user to an abnormality in the recording operation.

Immediately after the recording by the head B, the signal reproduced by the head C is inputted to the microcomputer 90 via the pre-amp 43. The microcomputer 90 generates an envelope of the signal reproduced by the head C (step S141). The envelope can be easily generated by proper methods such as a digital to analog (D/A) conversion that converts digital signal reproduced by the head C into analog signal. By comparing the signal level of the envelope with a reference signal level, the microcomputer 90 determines whether there is an abnormality of recorded signal (step S142). For example, when the voltage level of the envelope is greater than the reference voltage level, the microcomputer 90 determines that there is no abnormality of recorded signal. Meanwhile, when the voltage level of the envelope is less than the reference voltage level, the microcomputer 90 determines there is an abnormality in the recorded signal. A voltage level usually obtained from the signal normally recorded on the magnetic tape 10 by the head B can be tentatively set as a reference signal level.

Figure 15:
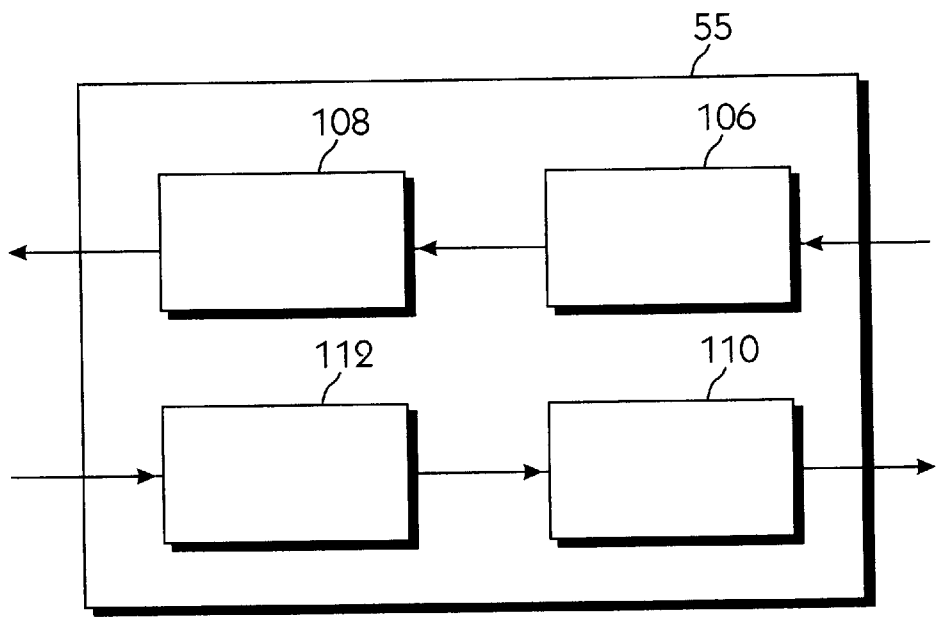
FIG. 15 is a diagram for explaining the function of the error check and compress system, in accordance with the principles of the present invention.

Please turn to FIG. 15, which shows a diagram for explaining the function of the error check and compress system 55, in accordance with the principles of the present invention. The unit 55 includes units 106, 108, 110, and 112.

When the inventive apparatus is recording data to the tape 10, then the units 106 and 108 are utilized. Unit 106 serves to perform processing for modulating, compressing, and arranging the data to be recorded. Unit 108 serves to transmit the modulated, compressed, and arranged data to the equalizer 50. The equalizer 50 will equalize the data and then transmit the equalized data to the pre-amp 40 for preamplification. Then the data will be transmitted to the heads so that the data can be recorded onto the tape 10.

When the inventive apparatus is reproducing data from the tape 10, then the units 110 and 112 are utilized. Unit 112 serves to perform processing for demodulating, expanding, and rearranging the data to be reproduced. Unit 110 serves to transmit the demodulated, expanded, and rearranged data to the microcomputer 90. The microcomputer will then perform the comparisons to detect abnormalities, as described above.

With reference to FIG. 5, data shall be transmitted from unit 55 to unit 40 and then to unit 30 when the present invention is in a write mode or recording mode. Data shall be transmitted from unit 30 to unit 40 to unit 50 and then to unit 55 when the present invention is in a read mode or reproducing mode.

As described above, the preferred embodiments of the present invention use the head C, which is used in the long-play mode of the SDL type recorder/player, to detect the abnormality of the recorded signal. That is, in the digital magnetic recorder/player which can be operated both according to the SD type and SDL type, the head C, which is not used especially according to the SD type apparatus, is used to detect the abnormality of the recorded signal. Accordingly, without having to employ an additional recording/reproducing head, the abnormality of the recorded signal can be detected by the head C which is installed in the general digital magnetic recorder/player.

Also, in the digital magnetic recorder/player which is not provided with all of the three heads A, B, and C, the method for detecting abnormality of the recorded signal according to the present invention still can be applied by adding a separate reproducing head.

The preferred embodiments of the present invention show the case where only the abnormality of signal recorded by the head B is detected by reproducing signal recorded by the head B. However, since the foreign substance, which can be the main cause of the malfunction of the head, is attached on the heads when the heads are used or exposed in the air for a long period of time, the presence of foreign substances on one head (head B) means the same situation at the other heads which have been used or exposed in the air for the same period of time as the head A. Accordingly, the result obtained after detecting abnormality of the signal recorded by the head B can sufficiently show the abnormality of the recorded signal of the digital magnetic recorder/player.

According to the present invention as described above, an abnormality of recorded signal, which is caused due to the presence of the foreign substances or from other problem sources, can be detected either by A) reproducing the signal which is recorded on the magnetic tape 10 and checking the data format of the signal, or by B) comparing the voltage level of an envelope of recorded signals with a reference voltage level. Accordingly, the user has a convenience since she/he is notified of the abnormality of recorded signal while performing recording. Further, since a head for long play mode, which is not used in the standard mode, is used to detect the abnormality of the recorded signal, the abnormality detection can be easily performed without having to employ an additional recording head.

The foregoing paragraphs describe the details of an apparatus and method for detecting an abnormality of a recorded signal of a digital magnetic recorder/player, and more particularly, describe the details of an apparatus and method for detecting an abnormality of a recorded signal during a recording on a magnetic tape, which is occurred when the signal is abnormally recorded due to foreign substances attached to a head or from other problem sources.

The present invention can be applied to digital video cassette (DVC) units, other types of video recording units, audio recorders. In addition, the present invention can be used in conjunction with media other than the digital magnetic tape 10 described above. For example, other media, such as the media used by computers, including a hard disk drive used by a computer and a removable medium used by a computer, and the like, can be used in conjunction with the principles of the present invention. The present invention can be applied to magnetic media such as magnetic tape, disks used in hard disk drives, disks used in other drives, and the like. The present invention can also be applied to optical media such as a factory pressed compact disk (CD), a compact disk-recordable (CD-R), a compact disk-rewriteable (CD-RW), laser disks, and other optical media.

The detected abnormality in the recorded signal can be caused by a presence of contamination on a head, by a presence of foreign substances on a head, by a presence of contamination on a medium, by a poorly manufactured medium, by an excessively used medium, by an unstable power supply, or by other problem sources.

In accordance with the principles of the present invention, a head C reads data that was written by head B, and then a determination is made as to whether there are abnormalities or irregularities or problems with the data written by head B. The use of head C to reproduce a recorded signal, in accordance with the principles of the present invention, need not be limited to a standard definition (SD) mode. The head C can be used in modes different from the standard definition (SD) mode, in accordance with the principles of the present invention.

As described above, in a recording operation in the standard definition long play (SDL) mode, the heads A and C are used to record information on tape 10, while head B is unused. A particular track of tape 10 will be adjacent to head B before that particular track is adjacent to head C, in accordance with the direction of rotation of drum 20 and the direction of travel of tape 10 shown in FIG. 1. When a record operation is performed in standard definition long play (SDL) mode, information previously recorded on the tape 10 can be read from the tape 10 using head B immediately prior to the head C writing new information onto the tape 10. The information read by head B can then be written to another medium or otherwise transmitted. Thus, the previously written information on tape 10 can be stored before it is overwritten by the is information being written by head C. This technique is fast, convenient, and efficient, because two tasks can be accomplished at once. That is, first information can be read from tape 10 (using head B) and then second information can be written to tape 10 (using heads A and C) all in one operation, without any need to stop rotation of the tape 10.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus for detecting abnormalities, said apparatus comprising:
    a plurality of heads for recording data onto a medium and reproducing data from the medium;
    a controlling unit for controlling said plurality of heads to reproduce a signal from the medium while the signal is being recorded onto the medium; and
    a determining unit for determining an abnormality in the recorded signal by comparing a signal level of an envelope of the reproduced signal with a reference signal level.

2. The apparatus of claim 1, said determining unit determining the abnormality in the recorded signal in dependence upon whether a data format of at least a part of the signal reproduced from the medium is abnormal.

3. The apparatus of claim 1, said plurality of heads comprising:
    a first head formed on a head drum;
    a second head formed on the head drum; and
    a third head formed on the head drum and between said first and second heads.

4. The apparatus of claim 3, said first, second, and third heads comprising first, second, and third recording and reproducing heads, respectively.

5. The apparatus of claim 3, said first and second heads being separately located.

6. The apparatus of claim 3, said first head having a first azimuth angle, said second head having a second azimuth angle different from said first azimuth angle.

7. The apparatus of claim 3, said first and second heads being respectively formed on outer opposite surfaces of the head drum.

8. The apparatus of claim 3, said first and second heads being formed on the outer surface of the head drum.

9. The apparatus of claim 3, said third head reproducing the signal from the medium while the signal is being recorded onto the medium by at least one of said first and second heads.

10. An apparatus for detecting abnormalities, said apparatus comprising:
    a plurality of heads for recording data onto a medium and reproducing data from the medium;
    a controlling unit for controlling said plurality of heads to reproduce a signal from the medium while the signal is being recorded onto the medium; and
    a determining unit for determining an abnormality in the recorded signal;
    wherein said plurality of heads comprises a first head formed on a head drum, a second head formed on the head drum, and a third head formed on the head drum and between said first and second heads;
    said first and second heads having azimuth angles different from each other, and said third head having an azimuth angle identical with the azimuth angle of one of said first and second heads.

11. An, apparatus for detecting abnormalities, said apparatus comprising:
    a plurality of heads for recording data onto a medium and reproducing data from the medium;
    a controlling unit for controlling said plurality of heads to reproduce a signal from the medium while the signal is being recorded onto the medium; and
    a determining unit for determining an abnormality in the recorded signal;
    wherein said plurality of heads comprises a first head formed on a head drum, a second head formed on the head drum, and a third head formed on the head drum and between said first and second heads;
    said first and second heads being used to record the signal in a standard definition mode, said third head being used to record the signal in a standard definition long-play mode, said third head not being used to record the signal in the standard definition mode.

12. An, apparatus for detecting abnormalities, said apparatus comprising:
   a plurality of heads for recording data onto a medium and reproducing data from the medium;
   a controlling unit for controlling said plurality of heads to reproduce a signal from the medium while the signal is being recorded onto the medium; and
   a determining unit for determining an abnormality in the recorded signal;
   wherein said plurality of heads comprises a first head formed on a head drum, a second head formed on the head drum, and a third head formed on the head drum and between said first and second heads;
   said third head performing said reproducing of the signal from the medium while the signal is being recorded onto the medium by one head selected from among said first and second heads.

13. An apparatus for detecting abnormalities, said apparatus comprising:
   a plurality of heads for recording data onto a medium and reproducing data from the medium;
   a controlling unit for controlling said plurality of heads to reproduce a signal from the medium while the signal is being recorded onto the medium; and
   a determining unit for determining an abnormality in the recorded signal;
   wherein said plurality of heads comprises a first head formed on a head drum, a second head formed on the head drum, and a third head formed on the head drum and between said first and second heads;
   said first head recording a first signal onto the medium, said second head recording a second signal onto the medium, said third head reproducing one signal selected from among said first and second signals.

14. An apparatus for detecting abnormalities, said apparatus comprising:
   a plurality of heads for recording data onto a medium and reproducing data from the medium;
   a controlling unit for controlling said plurality of heads to reproduce a signal from the medium while the signal is being recorded onto the medium;
   a determining unit for determining an abnormality in the recorded signal; and
   a head drum having said plurality of heads formed thereon;
   said plurality of heads comprising:
      a first head for recording first information, selected from the data, onto the medium;
      a second head for recording second information, selected from the data, onto the medium;
      said first and second heads being respectively formed at separate locations of said head drum; and
      a third head for reproducing third information from the medium, said third information comprising information selected from among the first and second information, said third head being formed on the outer surface of said head drum and between said first and second heads;
      said first head having a first azimuth angle, said second head having a second azimuth angle different from said first azimuth angle.

15. The apparatus of claim 14, said first and second heads being respectively formed on outer opposite surfaces of the head drum.

16. A method for detecting an abnormality of a recorded signal, comprising the steps of:
   recording a signal on a medium;
   reproducing the signal from the medium while the signal is being recorded onto the medium; and
   determining an abnormality of the recorded signal by comparing a signal level of an envelope of the reproduced signal with a reference signal level.

17. The method of claim 16, the signal being recorded by a digital recorder/player.

18. The method of claim 16, said determining step determining the abnormality of the recorded signal in dependence upon whether a data format of at least a part of the signal reproduced from the medium is abnormal.

19. A method for detecting an abnormality of a recorded signal, comprising the steps of:
   recording a signal on a medium;
   reproducing the signal from the medium while the signal is being recorded onto the medium; and
   determining an abnormality of the recorded signal;
   said recording step being performed by a head used to record the signal on the medium when in a standard definition mode, said reproducing step being performed by a head used to record the signal on the medium when in a standard definition long-play mode, said reproducing step not being performed by a head used to record the signal on the medium when in the standard definition mode.

20. An apparatus, comprising:
   a plurality of heads for recording data onto a medium and for reproducing data from the medium, said heads reproducing a signal from the medium while the signal is being recorded onto the medium; and
   a determining unit for determining an abnormality in the recorded signal in dependence upon the signal reproduced from the medium;
   said plurality of heads comprising a first head formed on a head drum, a second head formed on a head drum, and a third head formed on the head drum and between said first and second heads;
   said first and second heads having azimuth angles different from each other, and said third head having an azimuth angle identical with the azimuth angle of one of said first and second heads.

21. The apparatus of claim 20, said apparatus comprising a digital recorder and player, the data and the signal comprising digital data and a digital signal.

22. The apparatus of claim 21, the reproduced signal comprising a signal recorded by at least one of said heads.

23. The apparatus of claim 20, said first head, said second head, and said third head comprising first, second, and third recording and reproducing heads, respectively.

24. The apparatus of claim 20, said first and second heads being separately located.

25. The apparatus of claim 20, said first head having a first azimuth angle, said second head having a second azimuth angle different from said first azimuth angle.

26. The apparatus of claim 25, said first and second heads being respectively formed on outer opposite surfaces of the head drum.

27. The apparatus of claim 20, said first and second heads being respectively formed on outer opposite surfaces of the head drum.

28. The apparatus of claim 20, said third head reproducing the signal from the medium while the signal is being recorded onto the medium.

29. The apparatus of claim 20, said determining unit determining the abnormality in the recorded signal in dependence upon a result obtained when comparing the reproduced signal with a reference signal.

30. The apparatus of claim 20, said determining unit determining the abnormality in the recorded signal in dependence upon whether a data format of at least a part of the reproduced signal is abnormal.

31. An apparatus, comprising:

a plurality of heads for recording data onto a medium and reproducing data from the medium, said heads reproducing a signal from the medium while the signal is being recorded onto the medium, said plurality of heads including first, second and third heads; and a determining unit for determining an abnormality in the recorded signal in dependence upon the signal reproduced from the medium;

said first and second heads being used to record the signal when in a standard definition mode, said third head being used to record the signal when in a standard definition long-play mode, said third head not being used to record the signal when in the standard definition mode.

32. An, apparatus, comprising:

a plurality of heads for recording data onto a medium and for reproducing data from the medium, said heads reproducing a signal from the medium while the signal is being recorded onto the medium; and a determining unit for determining an abnormality in the recorded signal in dependence upon the signal reproduced from the medium by comparing a signal level of an envelope of the reproduced signal with a reference signal level.

33. A recording and reproducing apparatus, comprising:

a controller for outputting first and second switching signals;

a first switch for operating in response to said first switching signal, said operating of said first switch activating a first head to record first data onto a medium; and a second switch for operating in response to said second switching signal, said operating of said second switch activating a second head to reproduce second data from the medium, said second data corresponding to said first data recorded on the medium;

said reproducing of said second data being performed during said recording of said first data, said second data reproduced from said medium being substantially identical to said first data recorded onto said medium when abnormalities are not present.

34. The apparatus of claim 33 further comprising:

a comparator for comparing predetermined reference data to said second data, and for outputting an alert signal to notify a user when said predetermined reference data is not substantially equal to said second data.

35. The apparatus of claim 34, said comparator not outputting said alert signal when said predetermined reference data is substantially equal to said second data.

36. The apparatus of claim 34, said alert signal comprising at least one of an audible sound, a visible light, a text message, and a vibration detectable by a user.

37. A recording and reproducing apparatus, comprising:

a processor having an input terminal and an output terminal;

said processor outputting a first data signal from said output terminal; and said processor receiving a second data signal at said input terminal during said outputting of said first data signal, said output terminal including a first head and a second head, said input terminal including a third head located between said first and second heads, said first head having a first azimuth angle, said second head having a second azimuth angle distinguishable from the first azimuth angle, said third head having a third azimuth angle not substantially distinguishable from an angle selected from among the first and second azimuth angles.

38. The apparatus of claim 37, said first data signal being recorded onto a medium when said first data signal is outputted from said output terminal, said second data signal being reproduced from the medium when said second data signal is received at said input terminal, said second data signal corresponding to said first data signal recorded on the medium.

39. The apparatus of claim 38, further comprising:

a determining unit for determining an abnormality in the first data signal recorded on the medium in dependence upon said second data signal reproduced from the medium.

40. The apparatus of claim 39, said determining unit comparing a predetermined reference data signal to said second data signal, and outputting an alert signal to notify a user when said predetermined reference data signal is not substantially equal to said second data signal.

* * * * *